United States Patent [19]

Beni et al.

[11] 4,258,984
[45] Mar. 31, 1981

[54] IRIDIUM OXIDE BASED ELECTROCHROMIC DEVICES

[75] Inventors: Gerardo Beni, Westfield; William C. Dautremont-Smith, Cranford; Lawrence M. Schiavone, Howell; Joseph L. Shay, Holmdel, all of N.J.

[73] Assignee: Bell Telephone Laboratories, Incorporated, Murray Hill, N.J.

[21] Appl. No.: 75,718

[22] Filed: Sep. 14, 1979

[51] Int. Cl.³ .................................................. G02F 1/17
[52] U.S. Cl. .................................... 350/357; 29/570
[58] Field of Search ............ 350/357; 29/570; 427/39, 58, 108, 109, 165, 166

[56] References Cited

U.S. PATENT DOCUMENTS

| 4,150,879 | 4/1979 | Bayard | 350/357 |
| 4,191,453 | 3/1980 | Beni et al. | 350/357 |
| 4,201,454 | 5/1980 | Beni et al. | 350/357 |

OTHER PUBLICATIONS

Beni et al., "Electrochromism in Anodic Iridium Oxide Films", Appl. Phys. Lett., vol. 33, No. 2, Jul. 15, 1978, pp. 208-210.

Beni et al., "Electrochomism of Heat-Treated Anodic Iridium Oxide Films in Acidic, Neutral, and Alkaline Solutions", App. Phys. Lett (33(7), Oct. 1, 1978, pp. 567-568.

Michel et al., "Transparent Conductive Films", *IBM Technical Disclosure Bulletin*, vol. 13, No. 12, May 1971, p. 3790.

*Primary Examiner*—James W. Davie
*Attorney, Agent, or Firm*—Bruce Schneider

[57] ABSTRACT

Electrochromic devices based on electrochromic iridium oxide electrodes are disclosed. These electrodes are iridium oxide entities produced by vacuum deposition techniques such as by sputtering from an iridium target in the presence of an oxygen atmosphere. All solid state electrochromic devices utilizing such electrodes are possible.

9 Claims, 2 Drawing Figures

IRIDIUM OXIDE BASED ELECTROCHROMIC DEVICES

BACKGROUND OF THE INVENTION

1. Field of the Invention

This invention relates to solid state devices and, more particularly, to solid state display devices.

2. Art Background

Electrochromic devices potentially offer certain significant advantages, e.g., memory. These devices are generally composed of (1) a liquid electrolyte, (2) an electrode which changes color upon application of an appropriate voltage to the device, i.e., an electrochromic electrode, and (3) a counterelectrode to this electrochromic electrode. For example, cells based on a liquid electrolyte using either an anodic iridium oxide (see, for example, S. Gottesfeld et al, *Applied Physics Letters*, 33, 208 (1978) and G. Beni and J. Shay, *Applied Physics Letters*, 33, 567, (1978)) or a tungsten bronze, $M_xWO_3$, electrochromic electrode (see Faughnan et al, *RCA Review*, 36, 177 (1975) and M. Green et al, *Thin Solid Film*, 38, 89 (1976)) have been reported. A very limited number of electrochromic cells based on all solid state components have been disclosed. The most widely studied of these cells utilizes a $Na_xWO_3$ electrode with a solid $Na$-$\beta$-$Al_2O_3$ electrolyte. Both liquid and solid configurations have their respective advantages. However, the potential for application of fabrication technology developed in conjunction with transistor devices is an alluring attribute of solid state electrochromic devices.

Despite the enticement of a developed fabrication technology, it is quite difficult to produce practical solid-state electrochromic display devices. Different electrochromic devices depend on different mechanisms for producing the electrochromic effect. Different mechanisms usually require different type materials which, in turn, lend themselves to different fabrication techniques. Even when considering a single electrochromic material, different techniques have led to widely divergent results. Thus, the development of solid state electrochromic devices, despite the advantages possibly afforded, has not been extensively exploited.

SUMMARY OF THE INVENTION

Electrochromic devices, including all solid state devices, based on an iridium oxide electrode produced by vacuum deposition techniques, that is techniques where the deposition relies on pressures below 0.5 mm such as sputtering, have been fabricated. These devices exhibit good response and memory properties. Additionally, unusual effects are obtainable when iridium oxide is vacuum deposited on metal substrates such as tantalum. For example, in the case of tantalum, a color change from yellow to blue upon an appropriate change in voltage is realized.

DETAILED DESCRIPTION

Figure 1:
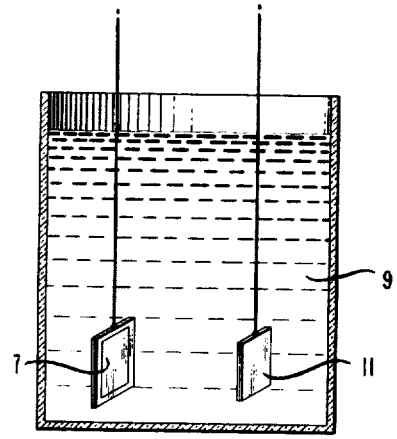
FIGS. 1 and 2 are illustrations of possible configurations for devices within the subject invention.

The invention relies on the discovery that electrochromically active iridium oxide is formed through vacuum deposition techniques, i.e., techniques where the deposition relies on an environment having a pressure less than 0.5 mm, preferably less than 100 μm. For example, evaporation techniques typically require the apparatus to be evacuated to pressures below 1 μm before evaporation begins so that the vapor stream flows directly to the substrate. Although after evaporation begins, higher ambient pressures are present, the technique relies on the initial lower pressure. Similarly, for sputtering at pressures above about 200 μm the plasma is not ignitable. In a preferred embodiment, reactive sputtering is utilized. An iridium target approximately 2 inches in diameter and 15 mils thick composed of 99.9% pure iridium is positioned in the target holder of a conventional sputtering apparatus, e.g., rf sputtering apparatus. (See "*Vacuum Deposition of Thin Films,*" L. Holland (Chapman and Hall, London, 1966) for a description of a typical sputtering apparatus). The substrate to be coated with the electrochromic iridium oxide film is placed on a watercooled substrate holder in the sputtering chamber. The chamber is then evacuated to a pressure less than $10^{-6}$ Torr. An oxidizing atmosphere is then introduced into the chamber.

In a preferred embodiment, $O_2$ is utilized. Preferably to obtain highly transparent films, the $O_2$ is diluted with an inert gas such as argon. The optical properties of the deposited film are strongly dependent upon the sputtering atmosphere. In particular, the extent of transparency of the film in its bleached state is a strong function of the $O_2$ partial pressure and the sum of the $O_2$ and inert gas partial pressures, i.e., the total pressure. To obtain highly transparent films, it is necessary to maintain low $O_2$ partial pressure in conjunction with a relatively high inert gas partial pressure. For example, extremely transparent films are obtained when an $O_2$ partial pressure of 0.5 μm is used in conjunction with an $Ar + O_2$ pressure of 60 μm. Similarly, highly transparent films are obtained when an $O_2$ partial pressure of 2 μm and a total partial pressure of 40 μm are utilized. The exact combination necessary to produce this highly transparent film is somewhat dependent on the inert gas utilized and the particular sputtering conditions. Additionally, total pressures too high to prevent a discharge from being struck are not desirable. Generally for this reason pressures below 200 μm, preferably below 100 μm are desirable. If too low an $O_2$ partial pressure is utilized, e.g., if less than 0.1 μm of $O_2$ in a total pressure of 10 μm is employed, a disadvantageous metallic opaque film is obtained.

The requirements for the $O_2$ and inert gas partial pressures are less rigorous where a highly transparent bleached state is not as important. For example, acceptable devices are producible when $O_2$ pressures in the range 0.25 μm to 20 μm are utilized in conjunction with Ar partial pressures in the range 10 to 60 μm. For a particular system, a control sample is used to determine the optimum conditions necessary to achieve the desired transparency.

A plasma is then struck by a conventional technique such as rf excitation. The deposition is continued typically, at rf power density levels in the range of 0.75 watts/cm² of target to 6.5 watts/cm² corresponding to target voltages in the range 500 to 1200 volts, for a time sufficient to yield the desired thickness of the electrochromic iridium oxide. Generally, the deposition rate of the iridium oxide is in the range 20 to 500 Å/min. It is desirable that the thickness of the electrochromic iridium oxide be in the range 500 to 5000 Å. Thicknesses greater than 5000 Å are undesirable since response times are substantially increased, and the bleached state is not sufficiently transparent. Thinner films are generally not advantageous since the colored state for such thin films is not of adequate optical density for most applications.

Other vacuum deposition techniques are employable. For example, evaporation of an iridium oxide film onto a substrate such as indium tin oxide coated glass produces a useful electrochromic electrode. Such evaporation is possible with a conventional evaporation apparatus as described in L. Holland supra. These evaporations are done by heating iridium oxide to a temperature sufficient to cause deposition on a substrate placed in the vapor stream. It should be noted that some film flaking of evaporated films when immersed in acidic solution is observed. This flaking is probably due to excessive deposition rates or substrate temperature. Therefore, use of solid electrolytes when flaking is observed with evaporated films is preferred.

Figure 2:
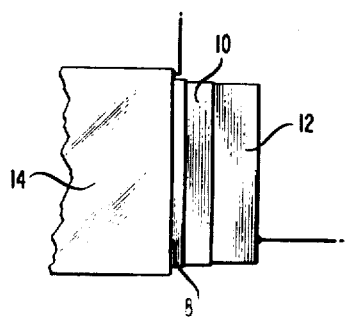

Both liquid (FIG. 1) and all solid (FIG. 2) device configurations are within the subject invention. As noted the devices of the subject invention employ an electrochromic electrode, 7 and 8 (in FIGS. 1 and 2, respectively), an electrolyte, 9 and 10, respectively, for liquid and all solid state configurations, and a counterelectrode, 11 and 12, respectively. In a preferred embodiment for an all solid state device, a geometry allowing observation of reflected light is used, i.e., the light seen by an observer is reflected almost totally from the electrolyte or to an extent, depending on the opacity of the electrolyte, also from the counterelectrode. Solid state devices relying on observation of transmitted light are also possible. The production of such a transmission device is significantly facilitated by the nature of vacuum deposition since it is generally possible to deposit material onto a variety of materials without substantial adhesion problems. Either reflective or transmissive geometries therefore are feasible.

Obviously in fabricating the inventive devices the substrate used in the vacuum deposition process depends on the type of device to be produced. For example, it is possible to vacuum deposit electrochromic iridium oxide onto a solid electrolyte. Contact to the vacuum deposited iridium oxide film is then made by conventional techniques and a counterelectrode is contacted to the other surface of the electrolyte. Alternatively, the electrochromic iridium oxide is vacuum deposited onto a transparent substrate 14 (in FIG. 2) such as a glass plate having a thin layer of tin oxide. The electrolyte is then contacted to the exposed portion of the film and a counterelectrode is, in turn, contacted to the exposed portion of the electrolyte to complete the cell.

It is also possible to deposit the electrochromic iridium oxide film on a metallic substrate. For example, when the described reactive sputtering deposition is performed utilizing a tantalum substrate excellent adhesion is obtained. The resulting cell produced by interfacing the exposed face of the electrochromic material and a counterelectrode with an electrolyte, e.g., immersing in 0.5 M $H_2SO_4$, and then forming a contact to the counterelectrode and to the electrochromic through the tantalum substrate by conventional means such as a pressure contact yields a highly desirable device. The metallic substrate is protected from contact to the electrolyte by conventional techniques such as mounting on a glass plate and then covering the exposed tantalum with epoxy.

This device built on tantalum exhibits a yellow color in the colored state and a blue in the bleached state. This is obtained by changing the potential of the electrochromic electrode by 1 volt. The absolute voltages used depend on the choice of counterelectrode, e.g., when a Pt counterelectrode is used, bleaching (blue color) is obtained for voltages applied to the electrochromic electrode of about $-1.75$ volts. Coloration (yellow color) is achieved by application of $+1.75$ volts. The exact reason for this alteration of the basic color of the bleached and colored state utilizing a tantalum substrate is not fully understood. However, it does illustrate that the invention comprehends the utilization of a wide variety of substrates which advantageously produce a corresponding variety of devices.

The choice of electrolyte is not critical. Polymeric electrolytes such as perfluorosulfonic acid resin are advantageously utilized since their physical flexibility reduces problems at the electrolyte and electrochromic material interface. This flexibility allows conformation between the electrochromic electrode and a solid electrolyte and is thus advantageous.

The coloration and bleaching mechanism in the iridium oxide film is due to the transfer of a charge carrier between the electrochromic electrode and the electrolyte. Suitable liquid electrolytes which allow this charge transfer are aqueous electrolytes or alternatively non-aqueous electrolyte containing anions having a formula weight less than 33. Solid electrolytes, i.e., those having a mobile anion with formula weight less than 33, such as those having a mobile $F^-$, e.g., $PbF_2$, or ion exchange membranes such as perfluorosulfonic acid are also suitable. (Anions for charge transfer having higher molecular weights than 33 yield slower response times and are unacceptable for most applications.) The conductivity of the electrolyte should be at least $10^{-5}$ ohm$^{-1}$ cm$^{-1}$. Lower conductivities lead to degraded response times for nominal voltages and are not acceptable for many device applications.

The composition of the counterelectrode is not critical. Counterelectrodes leading to electrochemical side reactions occurring at the counterelectrode/electrolyte interface although not precluded are, however, generally not desirable. This type of reaction (as occurs when Pt is utilized as a counterelectrode) is usually avoided if the counterelectrode has both ionic and electronic conduction and the counterelectrode is chosen to accept the mobile ion in the electrolyte. For example, it is possible to use another electrochromic iridium oxide film as the counterelectrode. Since the electrochromic iridium oxide has both ionic and electronic conductivity, it functions well as a counterelectrode.

The optical properties of the various components of the cell depend on the type cell desired. If the device is to be viewed in diffuse reflection, it is desirable that the electrolyte or the counterelectrode cause diffuse light scattering. This is typically achieved by pigmenting the electrolyte. Thus, when the electrochromic electrode is in the bleached state, light passes through the electrochromic electrode and is reflected from the electrolyte or the counterelectrode. When the electrode is colored, the absorption by the electrochromic electrode is substantially increased with a corresponding decrease in reflected light. When a substantially clear material is desired for use as the electrolyte in a reflection type cell, increased contrast is achieved by altering the optical properties of this material. In particular, when perfluorosulfonic acid resin is used it is advantageous to precipitate an opaque composition within the body of the electrolyte. For example, the electrolyte is boiled in an aqueous solution of a soluble barium salt, such as $Ba(NO_3)_2$, the electrolyte is then removed from this solution and boiled in a dilute solution of $H_2SO_4$. The interaction of the barium and the sulfate ion produce a white participate ($BaSO_4$) within the electrolyte material. This produces a white appearing electrolyte. It should be noted that this treatment surprisingly does not affect the conductivity properties of the electrolyte. Other colors are produced by precipitation of a suitably colored compound. For example, by precipitating CdS from $CdCl_2$ and $Na_2S$, a yellow-appearing electrolyte is obtained.

In a transmission device, light is incident on either the counterelectrode or the electrochromic electrode and is viewed from the opposite side of the device. In a transmission device, it is necessary that the electrolyte and the counterelectrode be transparent when the electrochromic electrode is in the bleached state. When the electrochromic electrode is colored, light is not transmitted through the cell and when the electrochromic electrode is bleached, transmission is possible.

Connection to a source of voltage is made by conventional techniques. For example, the electrochromic electrode is deposited on an indium tin oxide film and this indium tin oxide film acts as a means for attaching voltage leads. Similarly, a grid can be attached to the electrochromic electrode to introduce the potential. (It should be noted that when the electrochromic electrode is immersed in a liquid electrolyte, the conducting substrate and the associated leads should be electrically insulated from the electrolyte. This can be done, for example, by covering the exposed portion of the substrate and leads with epoxy.) Equally conventional techniques are utilized to make electrical connections to the counterelectrode. The voltages necessary to produce coloration and bleaching when a non-metallic deposition substrate for the iridium oxide is utilized also depend on the choice of electrolyte and counterelectrode. Color change is achieved by changing the electrochemical potential of the electrochromic electrode by about 1 volt. (The higher potential endpoint corresponding to the colored state and the lower to the bleached state.) Typically, if another electrochromic iridium oxide electrode of similar area is used as the counterelectrode, for full coloration and bleaching applied voltages in the range 0.7 to 1.3 volts plus and minus respectively are utilized. If partial coloration and bleaching are acceptable, applied potentials of lower magnitude than 0.7($\pm$) are employable. For example, for 50% coloration the voltages are reducible to approximately plus and minus 0.3 volts. If the counterelectrode has a much larger charge capacity than the electrochromic electrode by virtue of a larger volume, full coloration and bleaching of the smaller electrode is achievable for a voltage swing of approximately half that needed for electrodes of similar charge capacity. The absolute values of the applied voltages in this later case depends on the initial charge per unit volume of the counterelectrode. A control sample is used to determine the optimum voltage differences for a particular device. However, voltages which cause electrode or electrolyte decomposition are often not desirable. When such decomposition is to be avoided, the potential differences should be restricted.

The following examples illustrate typical reaction conditions and fabrication sequences for devices within the subject invention:

EXAMPLE 1

A piece of perfluorosulfonic acid resin approximately one centimeter square was placed in boiling $Ba(ClO_4)_2$ saturated aqueous solution and held there for about 1 hour. The acid resin was removed from the boiling solution and rinsed in distilled water. Following this treatment, the resin was then transferred to a 0.5 M sulfuric acid solution and boiled until no further increase in opacity occurred—typically about 2 hours. The resin was again rinsed with distilled water and dried with nitrogen gas. The substrate was placed on a watercooled sample holder of a conventional sputtering apparatus. The sputtering chamber was evacuated to a pressure of $2 \times 10^{-7}$ Torr. The chamber was then backfilled with $O_2$ which had been run through a water bubbler. (It was later found that the treatment with the water bubbler was unnecessary. However, the results obtained either with or without the water bubbler were the same and the use of the bubbler is not precluded.) The $O_2$ pressure was allowed to rise to approximately 30 $\mu$m to flush out the system. After a period of approximately 2 minutes, the discharge was ignited by utilizing an rf discharge employing an rf power of 25 watts and a target bias voltage of 700 volts. The target utilized was a disk of 99.9% pure iridium measuring approximately 5 cm in diameter and having a thickness of approximately 15 mils. Once the discharge was ignited the $O_2$ pressure was reduced to between 7 and 9 $\mu$m. The deposition after the plasma was ignited was continued for approximately 43 minutes. The discharge was then extinguished, the substrate was allowed to cool, and then the chamber was backfilled with nitrogen gas. The coated electrolyte was then rotated in the sample holder so that the opposite face was exposed. The same procedure was then continued to produce a second iridium oxide film on the electrolyte. The electrolyte with its two deposited iridium oxide films was then removed from the sputtering apparatus as described above. A thin strip was trimmed from all sides of the electrolyte to prevent shorting at the edges. (If the electrodes are both colored or both bleached one must be changed. This change is done by immersing the entity in 0.5 M sulfuric acid, making a pressure contact to one electrode only, immersing a Pt counterelectrode and applying a potential between the Pt and the contacted electrode.) The coated electrolyte was then placed between two indium tin oxide coated glass plates so that the indium tin oxide contacted the sputtered iridium oxide films. A silver strip ($\frac{1}{4}$ inch wide) using silver paint was coated into an exposed portion of the indium tin oxide. A pressure contact clip lead was then attached to each of these silver strips. The counterelectrode lead was grounded and the other lead was switched between $+2$ and $-2$ volts. (These higher voltages were acceptable on a pulsed basis. If the bleached or colored state must be maintained, these voltages somewhat degrade the device. Lower voltages are acceptable, but slower response times are obtained.) An easily discernible change in coloration was observed upon each change of voltage.

EXAMPLE 2

An indium tin oxide coated glass slide was sequentially treated by washing in detergent, rinsing in distilled water and then rinsing in isopropanol. The treated glass slide was then put into a vapor degreaser utilizing ... )propanol. This treatment was continued for approximately 1 hour and the glass substrate was then blown dry with nitrogen gas. A portion of the indium tin oxide coating, about ¼ inch wide along one edge, was masked with aluminum foil. The substrate with the indium tin oxide film exposed was placed in the sputtering apparatus and an electrochromic iridium oxide film was deposited as described in Example 1. However, only a ½ μm partial pressure of $O_2$ was introduced into the apparatus. This introduction of $O_2$ was followed by 60 μm of Ar producing a total pressure of 60.5 μm. This gas flow was continued for about 3 or 4 minutes. The rf plasma was ignited utilizing a power of 25 watts and a target bias voltage of 500 volts. However, the shutter masking the sample was not removed until 30 minutes after the plasma was ignited. The shutter was then removed and sputtering was allowed to continue for approximately 25 minutes. (The target utilized in this example was the same used in Example 1, except that it was 3 inches in diameter).

The exposed portion of the indium tin oxide which had been previously masked was coated with a silver strip (¼ inch wide) produced with silver paint. All but a ¼ inch square in the center of the iridium oxide film was coated with an insulating lacquer. A pressure contact was made to the silver strip and the exposed area of the electrochromic iridium oxide film was immersed in 0.5 M sulfuric acid. A Pt counterelectrode was also placed in the sulfuric acid solution. A saturated calomel electrode, for experimental purposes, was placed in sulfuric acid solution and the voltage of 1 volt relative to the SCE was applied to the electrochromic electrode. The voltage was cycled between 0 and 1 volts. An indium tin oxide coated glass sample was then immersed as an optical reference in the sulfuric acid. Through this reference sample transmission of light from a helium/neon laser (6328 Å) was measured. The reference electrode was removed and the unmasked portion of the electrochromic iridium oxide electrode was placed in the beam. At 1 volt a transmission of 30% of the reference sample was observed and at 0 volt a transmission of 71% of the reference sample was observed.

EXAMPLE 3

A vacuum deposited iridium oxide film was produced on a tantalum substrate by the method described in Example 1. However, a sputtering power of 60 watts and a target bias voltage of 1 kV was utilized. The sputtering was continued for approximately 45 minutes. An area of ¼ inch square of the sputtered film was masked as described in Example 2. The electrochromic iridium oxide described in Example 2 in an 0.5 M sulfuric acid aqueous solution. Voltages were applied as previously described between 0 and +1 volt (relative to SCE), and these voltages produced a blue and yellow color respectively.

We claim:

1. A device comprising an electrochromic electrode and a counterelectrode in intimate contact with an electrolyte characterized in that said electrochromic electrode comprises a vacuum deposited iridium oxide film.

2. The device of claim 1 wherein said iridium oxide film is deposited on a conducting substrate.

3. The device of claim 2 wherein said conducting substrate comprises tantalum.

4. The device of claim 2 wherein said conducting substrate comprises indium tin oxide.

5. The device of claim 2 wherein said conducting substrate is said electrolyte.

6. The device of claim 1 wherein said electrolyte comprises perfluorosulfonic acid resin.

7. The device of claim 6 wherein said electrolyte is opacified.

8. The device of claim 1 wherein said iridium oxide film is a sputtered deposited film.

9. The device of claim 1 wherein said vacuum deposition is done in an environment comprising oxygen and an inert gas.

* * * * *